(12) United States Patent
Kim et al.

(10) Patent No.: US 7,585,083 B2
(45) Date of Patent: Sep. 8, 2009

(54) BACKLIGHT FOR DISPLAY DEVICE

(75) Inventors: Gi-Cherl Kim, Yongin-si (KR);
Seock-Hwan Kang, Suwon-si (KR);
Sang-Yu Lee, Yongin-si (KR); Ju-Young Yoon, Suwon-si (KR); Chun-Ho Song, Seoul (KR)

(73) Assignee: Samsung Electronics Co., Ltd. (KR)

( * ) Notice: Subject to any disclaimer, the term of this patent is extended or adjusted under 35 U.S.C. 154(b) by 317 days.

(21) Appl. No.: 11/197,368

(22) Filed: Aug. 5, 2005

(65) Prior Publication Data
US 2006/0028842 A1 Feb. 9, 2006

(30) Foreign Application Priority Data
Aug. 5, 2004 (KR) ............... 10-2004-0061695

(51) Int. Cl.
G09F 13/08 (2006.01)
F21V 7/04 (2006.01)
F21V 5/00 (2006.01)

(52) U.S. Cl. .......... 362/97.3; 362/97.4; 362/612; 362/620; 362/617; 362/245; 362/330

(58) Field of Classification Search .......... 362/612, 362/617–620, 252, 97.1–97.4, 121, 231, 362/245, 330
See application file for complete search history.

(56) References Cited

U.S. PATENT DOCUMENTS

| | | | | |
|---|---|---|---|---|
| 5,841,596 A * | 11/1998 | Perlo et al. | ............... | 359/859 |
| 6,199,989 B1 * | 3/2001 | Maeda et al. | ............... | 359/613 |
| 6,647,199 B1 * | 11/2003 | Pelka et al. | ............... | 385/146 |
| 6,679,621 B2 * | 1/2004 | West et al. | ............... | 362/327 |
| 6,974,229 B2 * | 12/2005 | West et al. | ............... | 362/227 |
| 7,006,306 B2 * | 2/2006 | Falicoff et al. | ............... | 359/800 |
| 7,063,450 B2 * | 6/2006 | Ehara et al. | ............... | 362/621 |
| 7,142,769 B2 * | 11/2006 | Hsieh et al. | ............... | 385/146 |
| 7,168,841 B2 * | 1/2007 | Hsieh et al. | ............... | 362/613 |
| 7,220,041 B2 * | 5/2007 | Chen et al. | ............... | 362/613 |
| 7,287,891 B1 * | 10/2007 | Park et al. | ............... | 362/555 |
| 7,320,531 B2 * | 1/2008 | West et al. | ............... | 362/231 |
| 7,322,721 B2 * | 1/2008 | Noh et al. | ............... | 362/327 |
| 7,334,933 B1 * | 2/2008 | Simon | ............... | 362/615 |
| 2002/0057561 A1 * | 5/2002 | Niida et al. | ............... | 362/26 |
| 2004/0042194 A1 * | 3/2004 | Hsieh | ............... | 362/31 |
| 2005/0007793 A1 * | 1/2005 | Yoshida et al. | ............... | 362/558 |
| 2007/0030414 A1 * | 2/2007 | Chang | ............... | 349/62 |
| 2007/0171678 A1 * | 7/2007 | Shim et al. | ............... | 362/616 |
| 2009/0034264 A1 * | 2/2009 | Zhu et al. | ............... | 362/297 |

FOREIGN PATENT DOCUMENTS

CN 1482497 A 3/2004

* cited by examiner

Primary Examiner—Jong-Suk (James) Lee
Assistant Examiner—David J Makiya
(74) Attorney, Agent, or Firm—Cantor Colburn LLP

(57) ABSTRACT

A backlight for a display device includes a board, a plurality of light emitting diodes (LEDs) mounted on the board, and a light guiding plate that is provided on the LEDs and has light reflecting grooves formed directly on respective LEDs. The light reflecting grooves are formed at an upper surface of the light guiding plate, having a shape of a reversed cone. In this backlight, the light traveling directly upward from the LED is efficiently reflected by total internal reflection and then recycled, resulting in a uniform light distribution of the backlight.

19 Claims, 7 Drawing Sheets

BACKLIGHT FOR DISPLAY DEVICE

CROSS REFERENCE TO RELATED APPLICATION

This application claims priority to and the benefit of Korean Patent Application No. 10-2004-0061695 filed on Aug. 5, 2004 which is hereby incorporated by reference for all purposes as if fully set forth herein.

BACKGROUND OF THE INVENTION

1. Field of the Invention

The present invention relates to a light source for a display device.

2. Description of the Related Art

Display devices used in image displays, such as television receivers and computer monitors, are classified as self-luminescence, and light receiving displays. Self-luminance displays include light emitting diodes (LEDs), electroluminescence (EL) devices, vacuum fluorescent displays (VFDs), field emission displays (FEDs), plasma display panels (PDPs), etc.,: Light receiving displays include liquid crystal displays (LCDs).

An LCD includes a pair of panels individually having electrodes on their inner surfaces, and a dielectric anisotropy liquid crystal layer interposed between the panels. In the LCD, varying of the voltage difference between the field generating electrodes, changes the transmittance of light passing through the LCD. Therefore, desired images are obtained by controlling the voltage difference between the electrodes.

In the LCD, the light may be a natural light or an artificial light emitted from a light source separately used with the LCD. For example, a backlight device may be used to provide artificial light to the LCD. The backlight device may use light emitting diodes (LEDs) or fluorescent lamps, such as cold cathode fluorescent lamps (CCFLs), external electrode fluorescent lamps (EEFLs), etc., as the light source. LEDs are popular because they are eco-friendly since they do not use mercury (Hg) and they have a longer work life than most other light sources. However, typical LEDs emit light directly upward and the light does not spread or disperse.

SUMMARY OF THE INVENTION

This invention provides a uniform light distribution to an LCD by a backlight system using LEDs.

Additional features of the invention will be set forth in the description which follows, and in part will be apparent from the description, or may be learned by practice of the invention.

The present invention discloses a backlight for a display device including a board comprising a plurality of light emitting diodes provided thereon and a light guiding plate provided on the light emitting diodes and comprising a plurality of light reflecting grooves, wherein the light reflecting grooves are provided at an upper surface of the light guiding plate, each having a substantially reverse-cone shape and the backlight satisfies the following equation $$d \geq \frac{6l \tan \theta}{2 \tan \theta_T - 5 \tan \theta}$$

where $l$ is a distance between a light emitting chip of the light emitting devise and a bottom surface of the light guiding plate, $\theta$ is the largest angle formed between the main axis of the light reflecting groove and the directly upward proceeding light to be intercepted, $\theta_T$ is an angle formed between a cross-section of the light reflecting groove and the main axis thereof, and d is a thickness of the light guiding plate.

The present invention also discloses a backlight for a display device including a board, a plurality of light emitting diodes provided on the board, and a light guiding plate provided on the light emitting diodes and comprising a plurality of light reflecting grooves, wherein the light reflecting grooves are formed at an upper surface of the light guiding plate and have a reversed cone-like shape that extends downward to a point such that an angle formed between a main axis of the light reflecting groove and a line that is tangent to a point of the cross-section thereof increases as the point recedes from the main axis.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
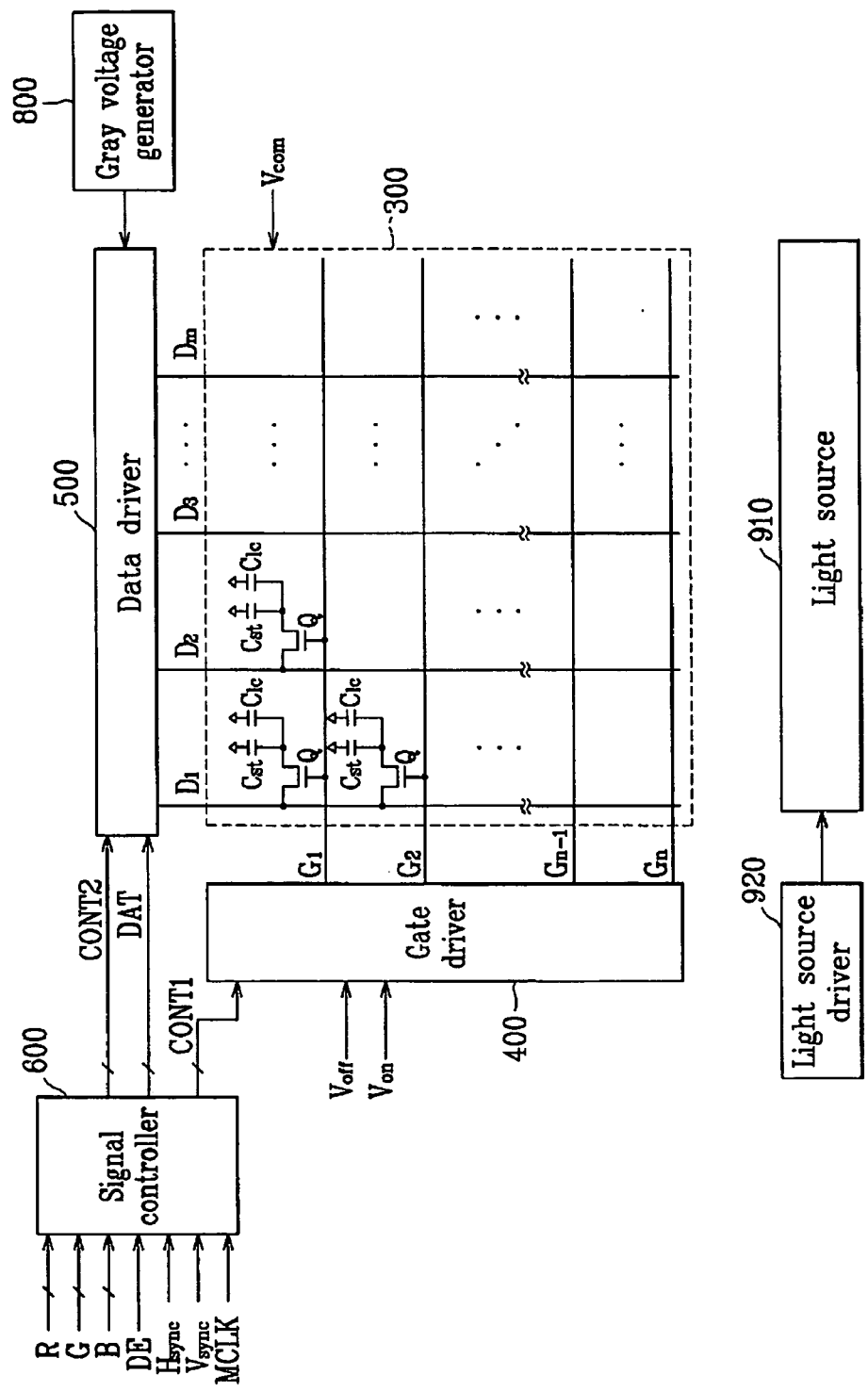
FIG. 1 is a block view of an LCD according to an embodiment of the invention.

Embodiments of the present invention are described more fully below with reference to the accompanying drawings, in which preferred embodiments of the invention are shown. The present invention may, however, be embodied in different forms and should not be construed as being limited to the embodiments set forth herein. Rather, these embodiments are provided so that this disclosure will be thorough and complete, and will fully convey the scope of the invention to those skilled in the art.

In the drawings, the thickness of the layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Hereinafter, a driving system of a light source device for a display device according to an embodiment of the present invention is described with reference to the accompanying drawings.

Figure 2:
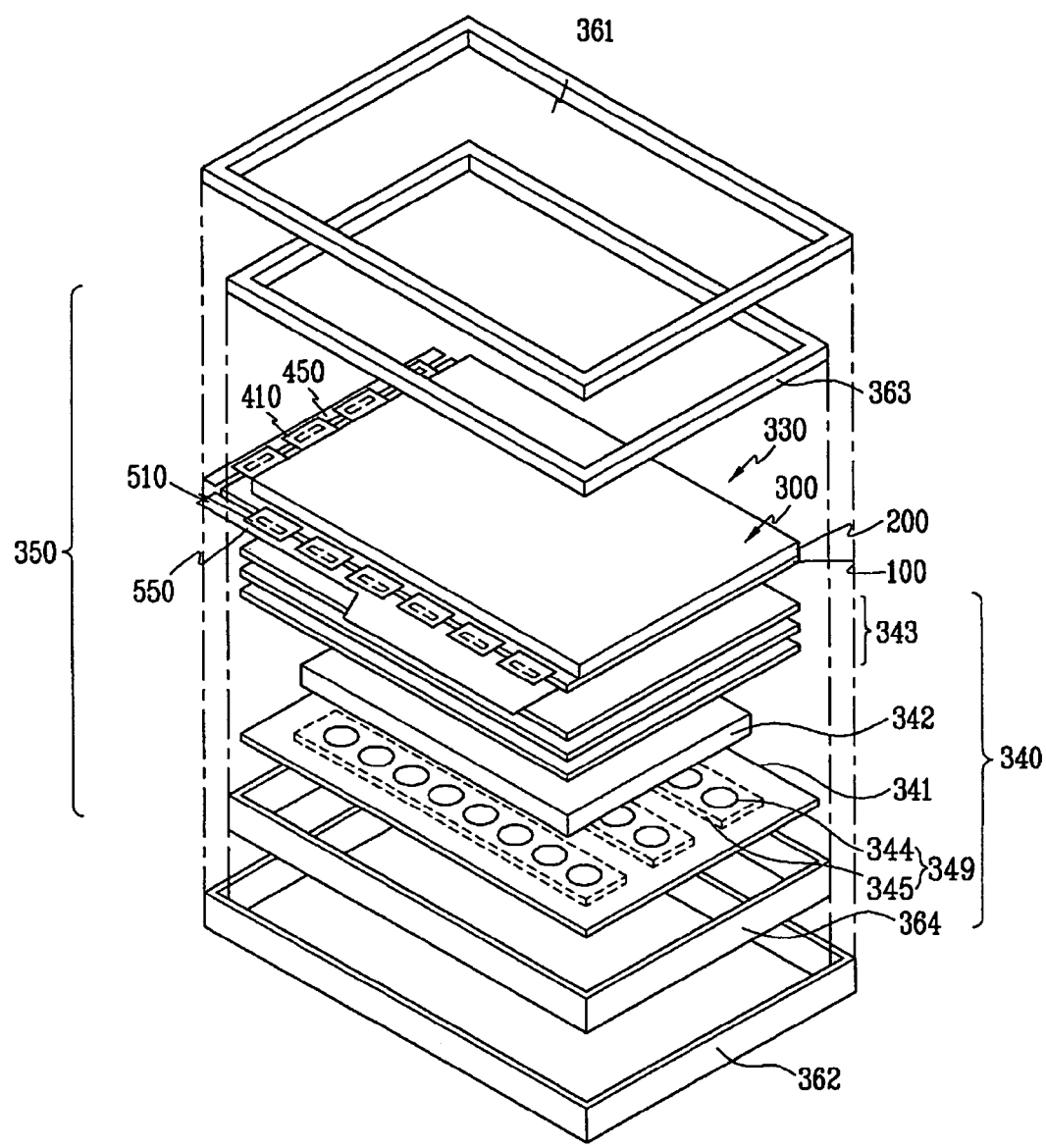
FIG. 2 is an exploded perspective view schematically illustrating an LCD according to an embodiment of the invention.
Figure 3:
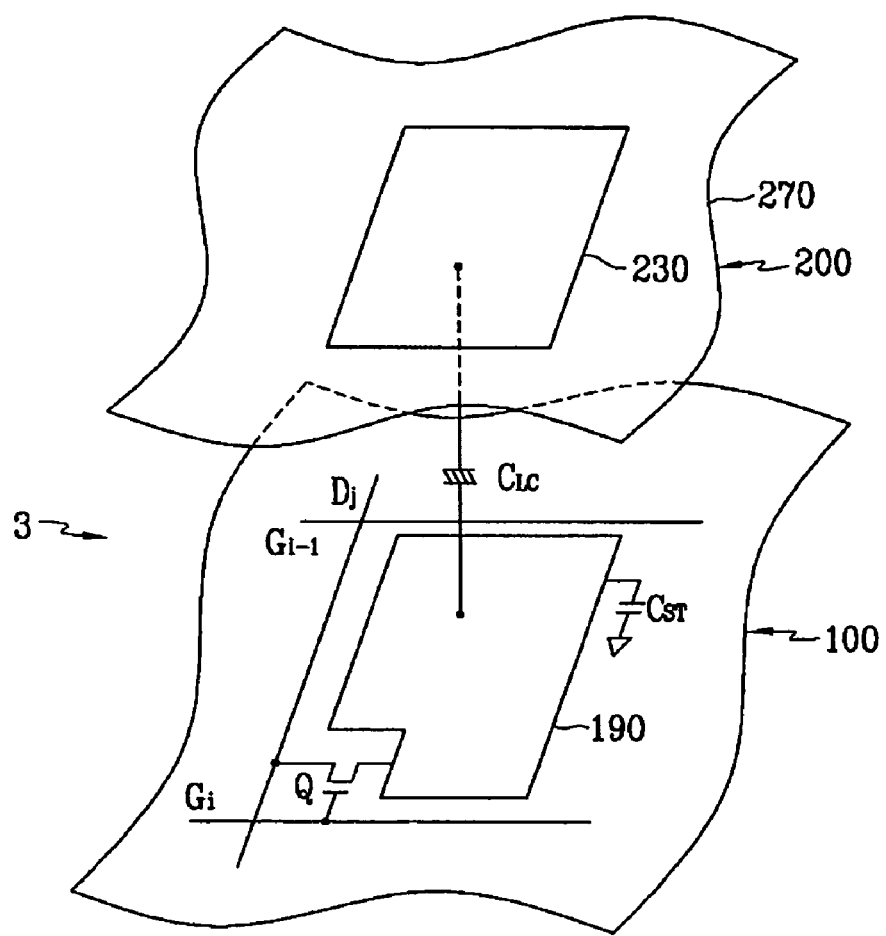
FIG. 3 is an equivalent circuit view of a pixel unit of an LCD according to an embodiment of the invention.

FIG. 1 is a block diagram of an LCD according to an embodiment of the invention. FIG. 2 is an exploded perspective view schematically illustrating an LCD according to an embodiment of the invention. FIG. 3 is an equivalent circuit view of a pixel unit of an LCD according to an embodiment of the invention.

Referring to FIG. 1, an LCD includes an LC panel assembly 300, a gate driver 400 and a data driver 500 are connected with the LC panel assembly 300, a gray voltage generator 800 connected with the data driver 400, a light source section 910 supplying light to the LC panel assembly 300, a light source driver 920 controlling a light source section 910, and a signal controller 600 controlling the above elements.

Referring to FIG. 2, the LCD includes an LC module 350 including a display unit 330, a backlight 340, a front housing 361 and a rear housing 362 for receiving and supporting the LC module 350, and mold frames 363 and 364.

The display unit 330 a gate tape carrier package (TCP) 410 and a data TCP 510, which are attached with the LC panel assembly 300, and a gate printed circuit board (PCB) 450 and a data PCB 550, which are respectively attached to the corresponding TCPs 410 and 510.

In the structure shown in FIG. 2 and FIG. 3, the LC panel assembly 300 includes a lower panel 100 and an upper panel 200 facing each other, and an LC layer 3 interposed therebetween. In a circuit shown in FIG. 1 and FIG. 3, the LC panel assembly 300 further includes a plurality of display signal lines $G_I$-$G_n$ and $D_I$-$D_m$ and a plurality of pixels connected thereto and arranged substantially in a matrix.

The display signal lines $G_I$-$G_n$ and $D_I$-$D_m$ are provided on the lower panel 100 and include a plurality of gate lines $G_I$-$G_n$ for transmitting gate signals (referred to as "scanning signals"), and a plurality of data lines $D_I$-$D_m$ for transmitting data signals. The gate lines $G_I$-$G_n$ extend substantially in a row direction and substantially parallel to each other, while the data lines $D_I$-$D_m$ extend substantially in a column direction and substantially parallel to each other. It is understood that the invention is not limited to such arrangement, for example, the gate lines $G_I$-$G_n$ may extend in a column direction and the data lines $D_I$-$D_m$ may extend in a row direction.

Each pixel includes a switching element Q which is connected with the display signal lines $G_I$-$G_n$ and $D_I$-$D_m$, an LC capacitor $C_{LC}$, and a storage capacitor $C_{ST}$. The storage capacitor $C_{ST}$ may be omitted depending on design needs.

The switching element Q, such as a thin film transistor (TFT), is provided on the lower panel 100 and includes three terminals: a control terminal connected to one of the gate lines $G_I$-$G_n$; an input terminal connected to one of the data lines $D_I$-$D_m$; an output terminal connected to both the LC capacitor $C_{LC}$, and the storage capacitor $C_{ST}$.

The LC capacitor $C_{LC}$ includes a pixel electrode 190 provided on the lower panel 100 and a common electrode 270 provided on the upper panel 200. The LC layer 3 interposed between the pixel electrode 190 and the common electrode 270 operates as a dielectric of the LC capacitor $C_{LC}$. The pixel electrode 190 is connected with the switching element Q, and the common electrode 270 is supplied with a common voltage $V_{com}$, and covers the surface of the upper panel 200, preferably covering the entire surface. The common electrode 270 may be provided on the lower panel 100. When the common electrode 270 is formed on the lower panel 100, at least one of the pixel electrode 190 and the common electrode 270 may be shaped as a bar or a stripe.

The storage capacitor $C_{ST}$ is an auxiliary capacitor for the LC capacitor $C_{LC}$. When the pixel electrode 190 and a separate signal line (not shown), which is provided on the lower panel 100, are overlapped with an insulator therebetween, the overlap portion is the storage capacitor $C_{ST}$. The separate signal line is supplied with a predetermined voltage, such as the common voltage $V_{com}$.

Alternatively, the storage capacitor $C_{ST}$ may be formed by overlapping of the pixel electrode 190 and a previous gate line that is provided directly before the pixel electrode 190, interposing an insulator therebetween.

For color display, each pixel exhibits one of three primary colors (referred to as spatial division), or sequentially exhibits three primary colors in turn depending on time (referred to as temporal division), so that the spatial or temporal sum of the primary colors are recognized as a desired color.

FIG. 3 shows an example of the spatial division where each pixel includes a color filter 230, for exhibiting one of the primary colors, in an area of the upper panel 200 corresponding to the pixel electrode 190. The color filter 230 may be provided on or under the pixel electrode 190 of the lower panel 100.

Referring to FIG. 2, the backlight 340 is mounted or provided under the LC panel assembly 300. The backlight 340 includes a light source unit 349 having a plurality of light emitting diodes (LEDs) 344 provided on a printed circuit board (PCB) 345 in a matrix or array, a light guiding plate 342, and a plurality of optical sheets 343 provided between the LC panel assembly 300 and the LEDs 344 for dispersing the light emitted from the LEDs 344 to the LC panel assembly 300.

The backlight 340 may further include a reflecting plate 341 provided over the PCB 345. The reflecting plate 341 may include a plurality of holes where light emitting chips of the LEDs 344 are protruded therethrough to reflect the light emitted from the LEDs 344 toward the LC panel assembly 300. The backlight 340 may further include mold frames 363 and 364, which are provided between the reflecting plate 341 and the light guiding plate 342 to establish and maintain regular spatial intervals between the light source unit 349 and the light guiding plate 342 and supporting the light guiding plate 342 and the optical sheets 343.

The light guiding plate 342 may include light reflecting grooves on an upper surface thereof.

The LEDs 344, as the light source, may use only white LEDs emitting white light, a mixing array of red, green, and blue LEDs, or a mixing array of a white LED and a red LED. When the LCD uses the array of the white LED and the red LED, the red LED operates as an auxiliary of the white LED. These LEDs are arranged on the PCB 345 in a predetermined form, thereby forming the light source unit 349.

FIG. 2 shows three light source units 349, however, the number of the light source units 349 may vary and is not limited to three.

Polarizers (not shown) may be provided on the outer surfaces of the two panels 100 and 200 for polarizing the light emitted from the light source units 349.

Referring to FIG. 1 and FIG. 2, the gray voltage generator 800 is included in the data PCB 550 and generates multiple sets of a plurality of gray voltages related to the transmittance of the pixels. The gray voltages in one set have positive polarity with respect to the common voltage $v_{com}$. The gray voltages of another set have negative polarity with respect to the common voltage $v_{com}$.

The gate drivers 400 are individually mounted on or attached with each gate TCP 410. The gate drivers 400 are individually connected with the gate lines $G_l$-$G_n$ of the LC panel assembly 300 for transmitting the gate signals to the gate lines $G_l$-$G_n$. The gate signals comprise combinations of the gate-on voltage $V_{on}$ and the gate-off voltage $V_{off}$ input from an external device. The gate TCP 410 may have the shape of an integrated circuit (IC) chip.

The data drivers 500 are individually mounted on or attached with each data TCP 510, having the shape of IC chips. The data drivers 500 are individually connected with the data lines $D_l$-$D_m$ of the LC panel assembly 300 for transmitting the data voltages to the data lines $D_l$-$D_m$. The data voltages selected from the gray voltages transmitted from the gray voltage generator 800. The data TCP 510 may have the shape of an IC chip.

According to another embodiment of the invention, the gate driver 400 or the data driver 500 is directly mounted on or attached with the lower panel 100. According to another embodiment of the invention, the gate driver 400 or the data driver 500 is integrated into the lower panel 100. In the above described and illustrated embodiments of the invention, the gate PCB 450 or the gate TCP 410 may be omitted.

The signal controller 600 may be included in the data PCB 550 or the gate PCB 450 for controlling the operation of the gate driver 400 or the data driver 500.

The operation of the above-described LCD is described below.

The signal controller 600 receives input image signals R, G, and B and input control signals for controlling the display thereof. The control signals may include, for example, a vertical synchronizing signal $V_{sync}$, a horizontal synchronizing signal $H_{sync}$, a main clock MCLK, a data enable signal DE, etc., from an external graphic controller (not shown). The signal controller 600 processes the image signals R, G, and B suitably for the operation of the LC panel assembly 300 and generates gate control signals CONT1 and data control signals CONT2. The signal controller 600 outputs the gate control signals CONT1 and the data control signals CONT2 to the gate driver 400 and the data driver 500, respectively.

The gate control signals CONT1 may include a vertical synchronizing start signal STV informing the start of a frame, a gate clock signal CPV controlling the output time of the gate-on voltage $V_{on}$, and an output enable signal OE defining the duration of the gate-on voltage $V_{on}$.

The data control signals CONT2 include a horizontal synchronizing start signal STH informing the start of data transmission, a load signal LOAD instructing to apply the data voltages to the data lines $D_l$-$D_m$, a reverse signal RVS reversing the polarity of the data voltages with respect to the common voltage $V_{com}$, and a data clock signal HCLK.

The data driver 500 successively receives the image data DAT for a row of the pixels from the signal controller 600, shifts the image data DAT, converts the image data DAT into analog data voltages selected from the gray voltages from the gray voltage generator 800, and applies the data voltages to data lines $D_l$-$D_m$ in response to the data control signals CONT2 received from the signal controller 600.

The gate driver 400 applies the gate-on voltage Von to the gate lines $G_l$-$G_n$ in response to the gate control signals CONT1 received from the signal controller 600, thereby turning on the switching elements Q connected thereto. The data voltages applied to the data lines $G_l$-$G_n$ are applied to the corresponding pixel through the activated switching elements Q.

The difference between the data voltage applied to the pixel and the common voltage $V_{com}$ is represented as a voltage across the LC capacitor $C_{LC}$, namely, a pixel voltage. The orientation of LC molecules in the LC capacitor $C_{LC}$ depends on the magnitude of the pixel voltage.

The light source driver 920 controls a current applied to the light source section 910 for switching the LED 344 of the light source section 910, and also controls the brightness of the light emitted from the LED 344.

When the light emitted from the LED 344 travels through the LC layer 3, the polarization of the light varies according to the orientations of the LC molecules. The polarizer converts the difference of the light polarization into a difference of the light transmittance.

By repeating this procedure by a unit of the horizontal period (which is denoted by "1H" and equal to one period of the horizontal synchronizing signal $H_{sync}$, the data enable signal DE, and the gate clock CPV), all of the gate lines $G_l$-$G_n$ are sequentially supplied with the gate-on voltage $V_{on}$ during a frame, thereby applying the data voltages to all pixels. When the next frame starts after finishing one frame, the polarity of the data voltages is reversed with respect to that of the previous frame (which is referred to as "frame inversion") by transmitting a reverse control signal RVS to the data driver 500. The reverse control signal RVS may be also controlled such that the polarity of the data voltages flowing along a data line in one frame are reversed (for example, line inversion and dot inversion), or the polarity of the data voltages in one packet are reversed (for example, column inversion and dot inversion).

Hereinafter, the light source section 910, which includes the light source unit 349 and the light guiding plate 342, used in the backlight according to an embodiment of the invention is described in with reference to FIG. 4 and FIG. 5.

Figure 4:
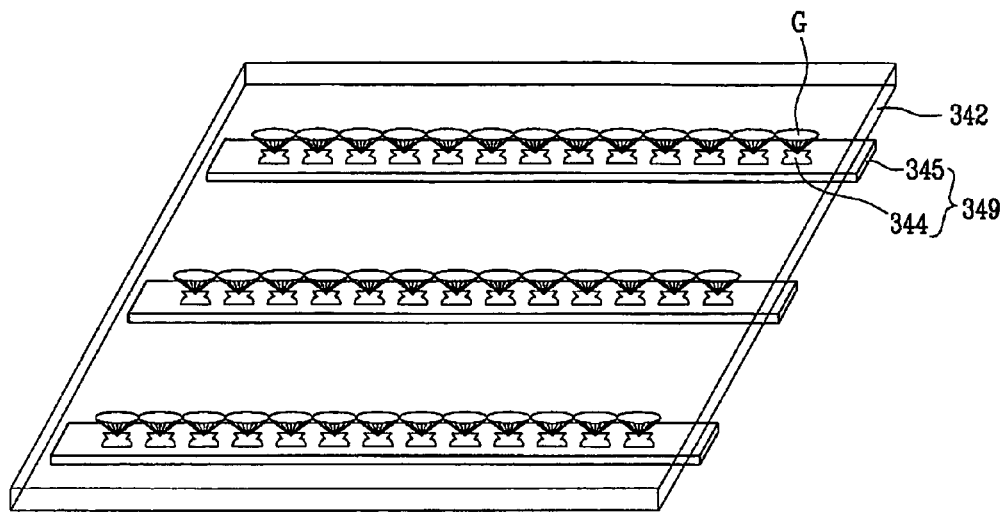
FIG. 4 is a layout view of a light guiding plate and LEDs used in a backlight for an LCD according to an embodiment of the invention.
Figure 5:
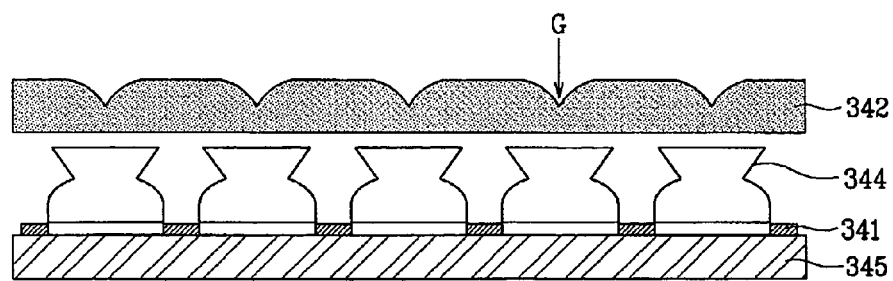
FIG. 5 is a cross-sectional view of a light guiding plate and LEDs used in a backlight according to an embodiment of the invention.

FIG. 4 is a layout view of a light guiding plate and LEDs used in a backlight for an LCD according to an embodiment of the invention. FIG. 5 is a cross-sectional view of a light guiding plate and LEDs used in a backlight according to an embodiment of the invention.

In FIG. 4, three light source units 349 are arranged substantially parallel to one another. The light source unit 349 includes a long band-shaped PCB 345 and a plurality of LEDs mounted on the PCB 345 at regular intervals. For example, as shown in FIG. 4, the number of the LEDs and the space of the interval between the LEDs may be controlled depending on the brightness of the light actually emitted from the respective LEDs and the brightness desirably required for backlighting the LCD. As previously discussed, the number of the light source units 349 may vary and is not limited to three and may be controlled depending on the number of the LEDs and the interval between them.

The light guiding plate 342 is provided on the light source unit 349, and light reflecting grooves G are formed on an upper surface thereof. The light reflecting grooves G may be cone shaped. The light reflecting grooves G are provided directly on the LEDs 344.

The light reflecting grooves G reflect the light proceeding directly upward from the LEDs by total internal reflection to disperse the light from the LEDs. A majority of the light emitted from the LEDs tends to concentrate directly up from the LEDs and does not spread or disperse. The light reflecting grooves G prevent such a concentration of light and uniformly disperse the light.

A particular lens may be applied to the LED to prevent light emitted from the LED from being directed mostly upward.

Figure 6:
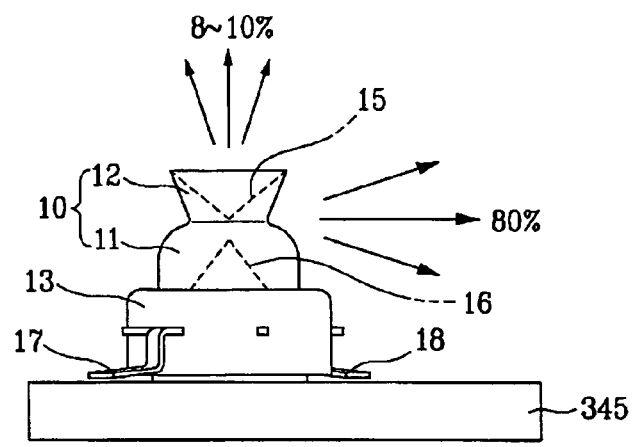
FIG. 6 is a side view of an LED used in a backlight according to another embodiment of the invention.

FIG. 6 is a side view of an LED used in a backlight according to another embodiment of the invention.

Referring to FIG. 6, the LED includes a body 13 and a dispersion lens 10.

The dispersion lens 10 includes a first portion 11 and a second portion 12. As shown in FIG. 6, the first portion 11 is rounded or curved, e.g., shaped like a hemisphere or hemi-oval, and includes a cone-shaped groove 16 upwardly entering from a bottom surface of the curved or rounded area which the main axis is equal to that of the first portion 11.

The second portion 12 is shaped like a partial portion of a reversed cone with the angular point portion removed, and is provided with a reversed cone-shaped groove 15 downwardly entering from a top surface thereof, of which the main axis is equal to that of the second portion 12. The second portion 12 is integrally provided or formed on the first portion 11 so that the main axes of the first portion 11 and the second portion 12 are the same.

The body 13 is provided with an LED chip (not shown) and lead lines 17 and 18 for supplying power to the LED chip.

Due to the configuration of the lens as described above, most of the light emitted from the LED is directed toward the side of the lens and the light traveling directly upward is significantly reduced.

Figure 7:
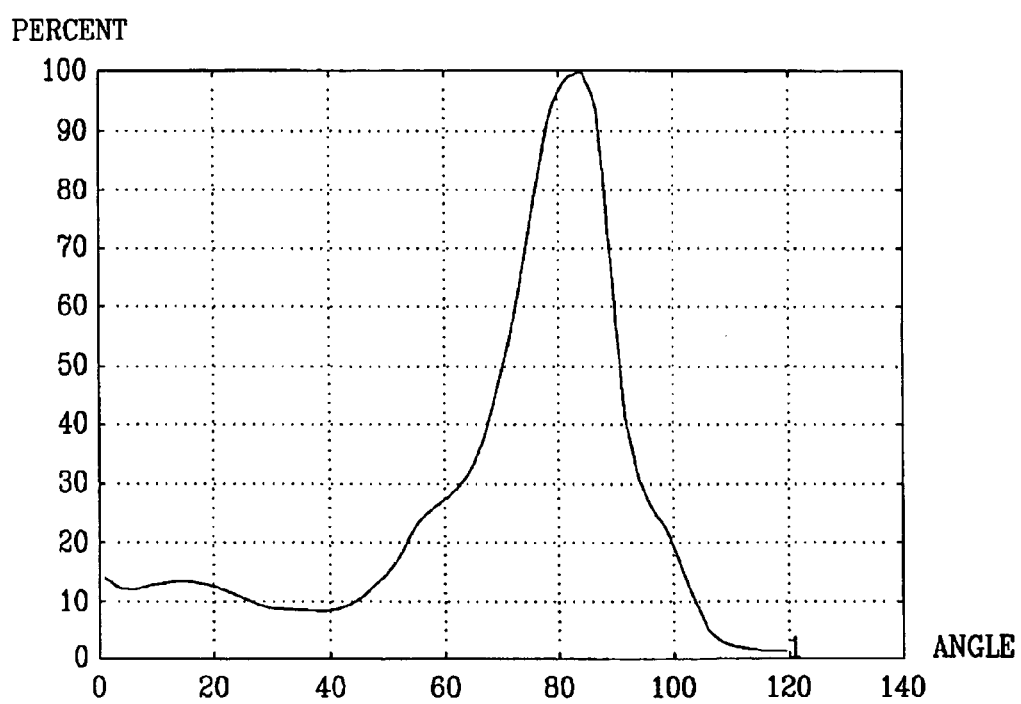
FIG. 7 is a graph showing the light distribution for the incident angle of the light emitted from the LED.

FIG. 7 is a graph showing the light distribution for the incident angle of the light emitted from the LED.

As shown in FIG. 7, the light emitted from the LED is dispersed in the range of 0° to approximately 120°, of which approximately 80% is aggregated in the range of 60° to 100°. The light ranging from 0° to 20° of the remaining 20% may be attributed to an uneven light dispersion since the light is only directed upward. To prevent the light from proceeding directly upward, the invention includes a light guiding plate 342 having light reflecting grooves for use with the backlight.

Figure 8:
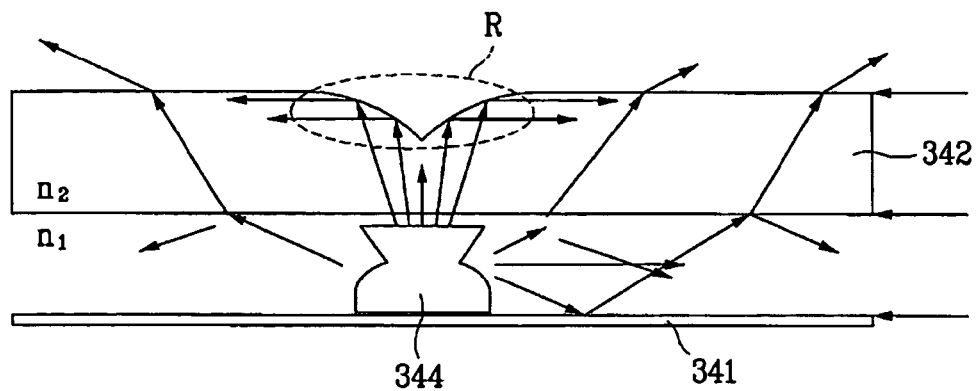
FIG. 8 is a cross-sectional view illustrating a light scattering effect by the light reflecting groove of the light guiding plate according to the embodiment of the invention.

FIG. 8 is a cross-sectional view for illustrating a light scattering effect by the light reflecting groove of the light guiding plate according to an embodiment of the invention.

As shown in FIG. 8, some of the side light emitted from the LED 344 is reflected by a light guiding plate 342 (which is based on Fresnel's law of reflection) and proceeds toward a reflection plate 341 to be reflected again. The rest of the side light enters the light guiding plate 342 after being reflected and then exits the light guiding plate 342. Such procedure makes dispersion of the light uniform. The light proceeding in the range of 0° to 20° is reflected at the light reflecting groove G of the light guiding plate 342 by internal reflections, which is represented as R, and returned within the light guiding plate 342. The light then travels within the light guiding plate 342 and is reflected at a bottom surface thereof by internal reflection. Otherwise, after the light travels toward the reflection plate 341, the light is returned by the reflection plate 341 and then proceeds toward the upper surface of the light guiding plate 342.

The light directly emitted from the LED 344 is recycled by total internal reflection as described the above, so that there is minimal loss of light. Further, since the light guiding plate 342 having the light reflecting grooves may be fabricated through an injection molding technique using a frame, the fabrication process of the device is made easier.

The depth angle of the light reflecting groove and the thickness of the light guiding plate 342 are described below.

Figure 9:
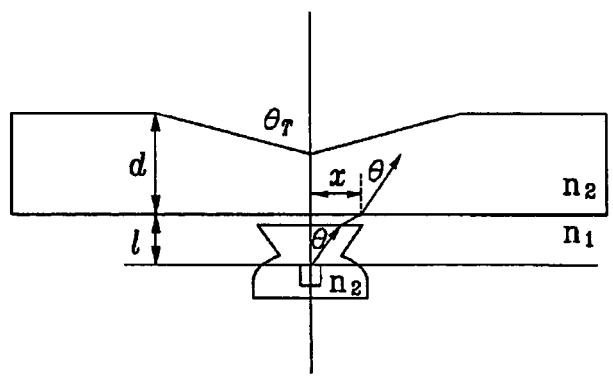
FIG. 9 and FIG. 10 are cross-sectional views of the light guiding plates for calculating a minimum possible thickness of each plate in the backlight according to an embodiment of the invention.
Figure 10:
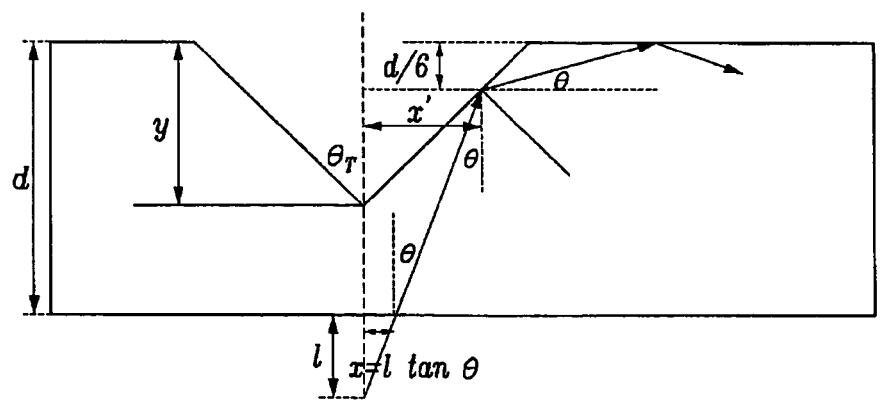

FIG. 9 and FIG. 10 are cross-sectional views of the light guiding plate for calculating a minimum possible thickness of each plate in the backlight according to an embodiment of the invention.

For total internal reflection of the vertical incident light with respect to the bottom surface of the light guiding plate 342 (which proceeds directly upward), the light reflection groove should be constructed so that an angle formed between a side thereof and a vertical line, which will be referred to as a depth angle $\theta_T$, satisfies the following equation:

$$\theta_T \leq 90° - \sin^{-1}\frac{n_1}{n_2} \qquad \text{(Equation 1)}$$

Equation 1 is derived from Snell's Law, in which $n_1$ is a refraction index of air and $n_2$ is a refraction index of the light guiding plate.

When the light proceeding between the solid angle of 0° to θ is emitted directly to the outside, such light hinders the uniform distribution of light distribution emitted from the backlight. Therefore, the light reflecting groove should be designed to have an optimum depth to intercept such a component and the light guiding plate should be dispersed to have a thickness suitable for forming such a groove. The optimum depth of the light reflection groove and the thickness of the light guiding plate are calculated below with reference to FIG. 9 and FIG. 10.

In FIG. 9, represents a distance from the LED chip to a bottom side of the light guiding plate, and x represents a distance from the main axis, or center of the light reflecting groove to a light reaching point where the light emitted from the LED chip at the angle of θ contacts the bottom side of the light guiding plate. X may be calculated by the following equations:

$$X = l \tan \theta.$$

The light emitted at the angle of θ reaches a position of the light reflecting groove corresponding to one-sixth (d/6) of the thickness of the light guiding plate from the upper surface of the light guiding plate. The light guiding plate 342 and the light reflecting groove are arranged so that the light emitted from the LED at an angle of θ reaches d/6 from the upper surface of the light guiding plate, which is a surplus space of the light reflecting groove, which takes into account an arrangement error of the light reflecting groove with respect to the LED and the light guiding plate fabrication process.

When the light emitted from the LED chip at the angle of θ with respect to the main axis of the light reflecting groove contracts the side of the light reflecting groove, the following equations are calculated.

$$\tan \theta_T = \frac{x'}{y - \frac{d}{6}} \qquad \text{(Equation 2)}$$

$$\tan \theta = \frac{x'}{l + \frac{5d}{6}} \qquad \text{(Equation 3)}$$

In the equations 2 and 3, x' is a distance from the main axis of the light reflecting groove to the point where the light emitted from the LED chip at an angle of θ makes contact with the light reflecting groove point and y is a depth of the light reflecting groove. Rearranging equation 2 and equation 3 to solve for d after eliminating x', results in the following equation.

$$d = \frac{6y \tan \theta_T - 6l \tan \theta}{\tan \theta_T + 5 \tan \theta} \quad \text{(Equation 4)}$$

The following equation is derived when the depth of the light reflecting groove (represented as y) is reduced to less than half the thickness of the guiding plate for stability of the light guiding plate ($y \leq d/2$).

$$d \leq \frac{3d \tan \theta_T - 6l \tan \theta}{\tan \theta_T + 5 \tan \theta} \quad \text{(Equation 5)}$$

The following equation is obtained when defining equation 5 for $\theta_T$.

$$d \geq \frac{6l \tan \theta}{2 \tan \theta_T - 5 \tan \theta} \quad \text{(Equation 6)}$$

Accordingly, the depth angle $\theta_T$ of the light reflecting groove and the thickness d of the light guiding plate are satisfied by the equations 1 and 6, respectively. For example, when the light guiding plate is made of a material having the refraction index of 1.5, such as glass, etc., $\theta_T \leq 90° - 42° = 48°$ by equation 1. Since $\theta$ is about 20° when $\theta_T = 48°$, d must satisfy equation 6.

$$d \geq \frac{2.18l}{2.22 - 1.82} = 5.55l$$

As mentioned in the above, the light reflecting groove must be designed to have at least the predetermined depth and the light guiding plate must have sufficient thickness to form such a groove. Design constraints require the light guiding plate to be as thin as possible to fabricate a sufficiently thin LCD. A method for reducing the thickness of the light guiding plate is described below.

Figure 11:
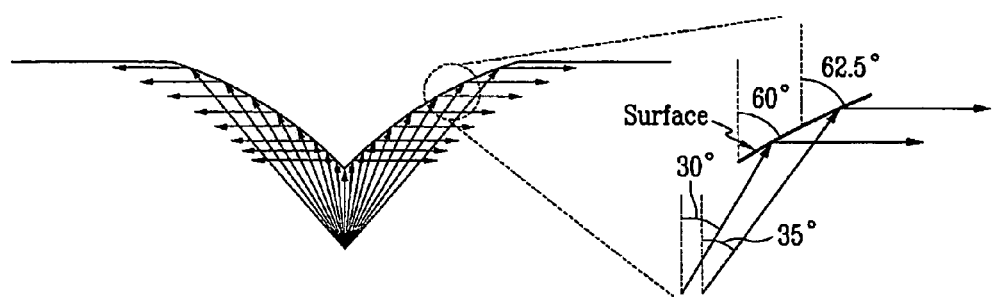
FIG. 11 is a cross-sectional view of a light reflecting groove of a light guiding plate used in a backlight according to another embodiment of the invention.

FIG. 11 is a cross-sectional view of a light reflecting groove of a light guiding plate used in a backlight according to an embodiment of the invention.

As shown in FIG. 11, a cross-section of the light reflecting groove forms a curved line as compared with a substantially V-shaped cross-section discussed above.

A depth angle $\theta_T$ formed between the main axis of the light reflecting groove and a tangent line of a point of the cross-section thereof increases as the point recedes from the main axis. In such a structure, even though the depth angle $\theta_T$ increases, the total internal reflection occurs since the farther the light reaching point in the light reflecting groove is from the main axis of the light reflecting groove, the larger the angle formed between the light proceeding direction and the main axis.

The light reflecting groove shaped as in FIG. 11 may be designed to have a shallow depth. Accordingly, the thickness of the light guiding plate may be reduced.

According to the invention, light traveling directly upward from the LED is reflected by the light reflecting grooves formed in the light guiding plate and is then recycled, resulting in a substantially uniform distribution of light from the backlight. Due to the light reflecting grooves, no additional process is needed for intercepting the light traveling directly upward from the LED.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight for a display device comprising:
a board;
a plurality of light emitting diodes (LEDs) mounted on the board; and
a light guiding plate comprising light reflecting grooves corresponding to respective LEDs, wherein the LEDs are disposed behind and spaced apart from a bottom surface of the light guiding plate at a predetermined distance, and
wherein the light reflecting grooves are formed at an upper surface of the light guiding plate, each having a shape of a reversed-cone and the backlight satisfies the following equation $$d \geq \frac{6l \tan \theta}{2 \tan \theta_T - 5 \tan \theta}$$

where d is a thickness of the light guiding plate, l is a distance from a light emitting chip of each LED behind the light guiding plate to the bottom surface of the light guiding plate, $\theta$ is the largest angle formed between the main axis of the light reflecting groove and the directly upward proceeding light to be intercepted, and $\theta_T$ is an angle formed between a cross-section of the light reflecting groove and the main axis thereof,
wherein the light emitting chip of each LED is non-coplanar with any portion of the light guiding plate.

2. The backlight of claim 1, which satisfies the following equation:

$$\theta_T \leq 90° - \sin^{-1} \frac{n_1}{n_2}$$

where $n_1$ is a refraction index of air and $n_2$ is a refraction index of the light guiding plate.

3. The backlight of claim 1, further comprising a reflective plate which includes a plurality of holes for exposing the light emitting chips of the LEDs and reflects light emitted from the LEDs toward the light guiding plate.

4. The backlight of claim 1, further comprising a plurality of optical sheets on the light guiding plate.

5. The backlight of claim 1, wherein the LED produces white light.

6. The backlight of claim 1, wherein a white LED producing white light and a red LED producing red light are included in the plurality of LEDs.

7. The backlight of claim 1, wherein all of a red LED producing red light, a green LED producing green light, and a blue LED producing blue light are included in the plurality of LEDs.

8. The backlight of claim 1, wherein the LED includes a body and a dispersion lens.

9. The backlight of claim 8, wherein the dispersion lens includes:
a first portion, which has a shape like a hemisphere or hemioval, and is provided with a cone-shaped groove upwardly entering from a bottom surface of the hemisphere or hemioval; and
a second portion, which has a shape like a partial portion of a reversed cone with the angular point cut off, and is provided with a reversed cone-shaped groove downwardly entering from a top surface thereof,
wherein the main axis of the first portion is equal to that of the second portion.

10. A backlight for a display device comprising:
a board;
a plurality of light emitting diodes (LEDs) mounted on the board; and
a light guiding plate comprising light reflecting grooves corresponding to respective LEDs,
wherein the LEDs are disposed behind and spaced apart from a bottom surface of the light guiding plate and a light emitting chip of each LED is disposed at a predetermined distance from the bottom surface of the light guiding plate and the light reflecting grooves are formed at an upper surface of the light guiding plate and have a shape of a reversed cone, and an angle formed between the main axis of the light reflecting groove and a tangent line of a point of the cross-section thereof becomes larger as the above point recedes from the main axis, and
wherein the light emitting chip of each LED is non-coplanar with any portion of the light guiding plate.

11. The backlight of claim 10, further comprising a reflective plate which includes a plurality of holes for exposing light emitting chips of the LEDs and reflects light emitted from the LEDs toward the light guiding plate.

12. The backlight of claim 10, further comprising a plurality of optical sheets on the light guiding plate.

13. The backlight of claim 10, wherein the LED produces white light.

14. The backlight of claim 10, wherein a white LED producing white light and a red LED producing red light are included in the plurality of LEDs.

15. The backlight of claim 10, wherein all of a red LED producing red light, a green LED producing green light, and a blue LED producing blue light are included in the plurality of LEDs.

16. The backlight of claim 10, wherein the LED includes a body and a dispersion lens.

17. The backlight of claim 16, wherein the dispersion lens includes:
a first portion, which has a shape like a hemisphere or hemioval, and is provided with a cone-shaped groove upwardly entering from a bottom surface of the hemisphere or hemioval; and
a second portion, which has a shape like a partial portion of a reversed cone with the angular point cut off, and is provided with a reversed cone-shaped groove downwardly entering from a top surface thereof,
wherein the main axis of the first portion is equal to that of the second portion.

18. The backlight of claim 1, wherein the bottom surface of the light guiding plate is a substantially continuous flat surface.

19. The backlight of claim 10, wherein the bottom surface of the light guiding plate is a substantially continuous flat surface.

* * * * *